United States Patent
Park et al.

(10) Patent No.: US 8,498,607 B2
(45) Date of Patent: Jul. 30, 2013

(54) METHODS AND SYSTEMS FOR POWER SAVINGS USING A MESSAGE INDICATION HEADER

(75) Inventors: Jong Ro Park, San Ramon, CA (US);
Chun Woo Lee, San Ramon, CA (US);
Kyoung Cheol Oh, Pleasanton, CA (US)

(73) Assignee: QUALCOMM Incorporated, San Diego, CA (US)

( * ) Notice: Subject to any disclaimer, the term of this patent is extended or adjusted under 35 U.S.C. 154(b) by 894 days.

(21) Appl. No.: 12/137,978

(22) Filed: Jun. 12, 2008

(65) Prior Publication Data

US 2009/0312073 A1 Dec. 17, 2009

(51) Int. Cl.
*H04B 1/16* (2006.01)
*H04B 1/38* (2006.01)
*H04M 1/00* (2006.01)

(52) U.S. Cl.
USPC ............... 455/343.1; 455/343.2; 455/574; 370/311; 370/349

(58) Field of Classification Search
USPC .............. 455/343.1–343.4, 574; 370/311, 370/349
See application file for complete search history.

(56) References Cited

U.S. PATENT DOCUMENTS

| | | | | |
|---|---|---|---|---|
| 5,596,315 A | * | 1/1997 | Olds et al. | 340/7.2 |
| 6,879,567 B2 | | 4/2005 | Callaway et al. | |
| 7,257,095 B2 | * | 8/2007 | Liu | 370/311 |
| 7,403,511 B2 | * | 7/2008 | Liang et al. | 370/338 |
| 7,710,939 B2 | * | 5/2010 | Shao et al. | 370/349 |
| 7,873,026 B2 | * | 1/2011 | Cho et al. | 370/350 |
| 7,953,030 B2 | * | 5/2011 | Seo et al. | 370/311 |
| 7,953,458 B2 | * | 5/2011 | Son et al. | 455/574 |
| 2004/0253958 A1 | * | 12/2004 | Chang et al. | 455/445 |
| 2005/0025080 A1 | | 2/2005 | Liu | |
| 2006/0029011 A1 | * | 2/2006 | Etemad et al. | 370/311 |
| 2006/0045035 A1 | * | 3/2006 | Liu | 370/311 |

(Continued)

FOREIGN PATENT DOCUMENTS

| | | |
|---|---|---|
| CN | 1806264 A | 7/2006 |
| JP | 2010506540 A | 2/2010 |
| WO | WO2008045502 A2 | 4/2008 |

OTHER PUBLICATIONS

Anonymous: IEEE Std 802.16e-2005: "IEEE standard for local and metropolitan area networks; Part 16: Air interface for fixed and mobile broadband wireless access systems; Amendment 2: physical and medium access control layers for combined fixed and mobile operation in licensed bands and Corrigendum 1", (Jan 1, 2006), pp. 263-264 Section 6.3.24.6: BS Broadcast Paging Message, ISBN: 978-0-7381-4856-4.

(Continued)

*Primary Examiner* — Simon Nguyen
(74) *Attorney, Agent, or Firm* — Charles Chesney

(57) ABSTRACT

Techniques for signaling a mobile communications device in a special operating state that data bursts contain messages relevant to the special operating state. The signaling may be implemented using one or more bits in a frame control header (FCH). As a result, the mobile communication device may be decode the FCH first and decode data bursts only if there is an indication the data bursts contain a relevant message. Power savings may be achieved at the mobile communications device by avoiding decoding data bursts with no relevant messages.

30 Claims, 13 Drawing Sheets

U.S. PATENT DOCUMENTS

| | | |
|---|---|---|
| 2006/0160558 A1* | 7/2006 | Kim et al. ............... 455/522 |
| 2007/0082714 A1 | 4/2007 | Beach et al. |
| 2007/0213941 A1* | 9/2007 | Schmuel et al. ............ 702/32 |
| 2008/0084941 A1* | 4/2008 | Mohanty et al. ........... 375/260 |
| 2008/0117996 A1* | 5/2008 | Kim et al. ............... 375/261 |
| 2008/0181156 A1* | 7/2008 | Ecclesine ............... 370/311 |

OTHER PUBLICATIONS

International Search Report and Written Opinion—PCT/US09/047129, International Search Authority—European Patent Office-27-11-2009.

Taiwan Search Report—TW098119777—TIPO—Oct. 11, 2012.

* cited by examiner

| Syntax | Size | Notes |
|---|---|---|
| DL_Frame_Prefix_format(){ | — | — |
| Used subchannel bitmap | 6bits | Bit #0 Subchannel group 0<br>Bit #1 Subchannel group 1<br>Bit #2 Subchannel group 2<br>Bit #3 Subchannel group 3<br>Bit #4 Subchannel group 4<br>Bit #5 Subchannel group 5 |
| Reserved | 1 bit | Shall be set to zero |
| Repetition_Coding_Indication | 2bits | 0b00: No repetition codingon DL-MAP<br>0b01: Repetition coding of 2 used on DL-MAP<br>0b10: Repetition coding of 4 used on DL-MAP<br>0b11: Repetition coding of 6 used on DL-MAP |
| Coding_Indication | 3 bits | 0b000: CC encoding used on DL-MAP<br>0b001: BTC encoding used on DL-MAP<br>0b010: CTC encoding used on DL-MAP<br>0b011: ZT TC encoding used on DL-MAP<br>0b100: CC encoding with optional interleaver<br>0b101: LDPC encoding used on DL-MAP<br>0b010 to 0b111 - reserved |
| DL-MAP_Length | 8 bits | |
| Reserved | 4 bits | Shall be set to zero |
| } | | |

| Syntex | Size | Notes |
|---|---|---|
| DL_Frame_Prefix_format(){ | — | — |
| Used subchannel bitmap | 6bits | Bit #0 Subchannel group 0<br>Bit #1 Subchannel group 1<br>Bit #2 Subchannel group 2<br>Bit #3 Subchannel group 3<br>Bit #4 Subchannel group 4<br>Bit #5 Subchannel group 5 |
| Reserved | 1 bit | Shall be set to zero |
| Repetition_Coding_Indication | 2bits | 0b00: No repetition codingon DL-MAP<br>0b01: Repetition coding of 2 used on DL-MAP<br>0b10: Repetition coding of 4 used on DL-MAP<br>0b11: Repetition coding of 6 used on DL-MAP |
| Coding_Indication | 3 bits | 0b000: CC encoding used on DL-MAP<br>0b001: BTC encoding used on DL-MAP<br>0b010: CTC encoding used on DL-MAP<br>0b011: ZT TC encoding used on DL-MAP<br>0b100: CC encoding with optional interleaver<br>0b101: LDPC encoding used on DL-MAP<br>0b010 to 0b111 - reserved |
| DL-MAP_Length | 8 bits | — |
| Message_Indication | 4 bits | Bit #0 DCD-UCD message<br>Bit #1 MOB TRE-IND message<br>Bit #2 MOD PAG-ADV message<br>Bit #3 Reserved |
| } | | |

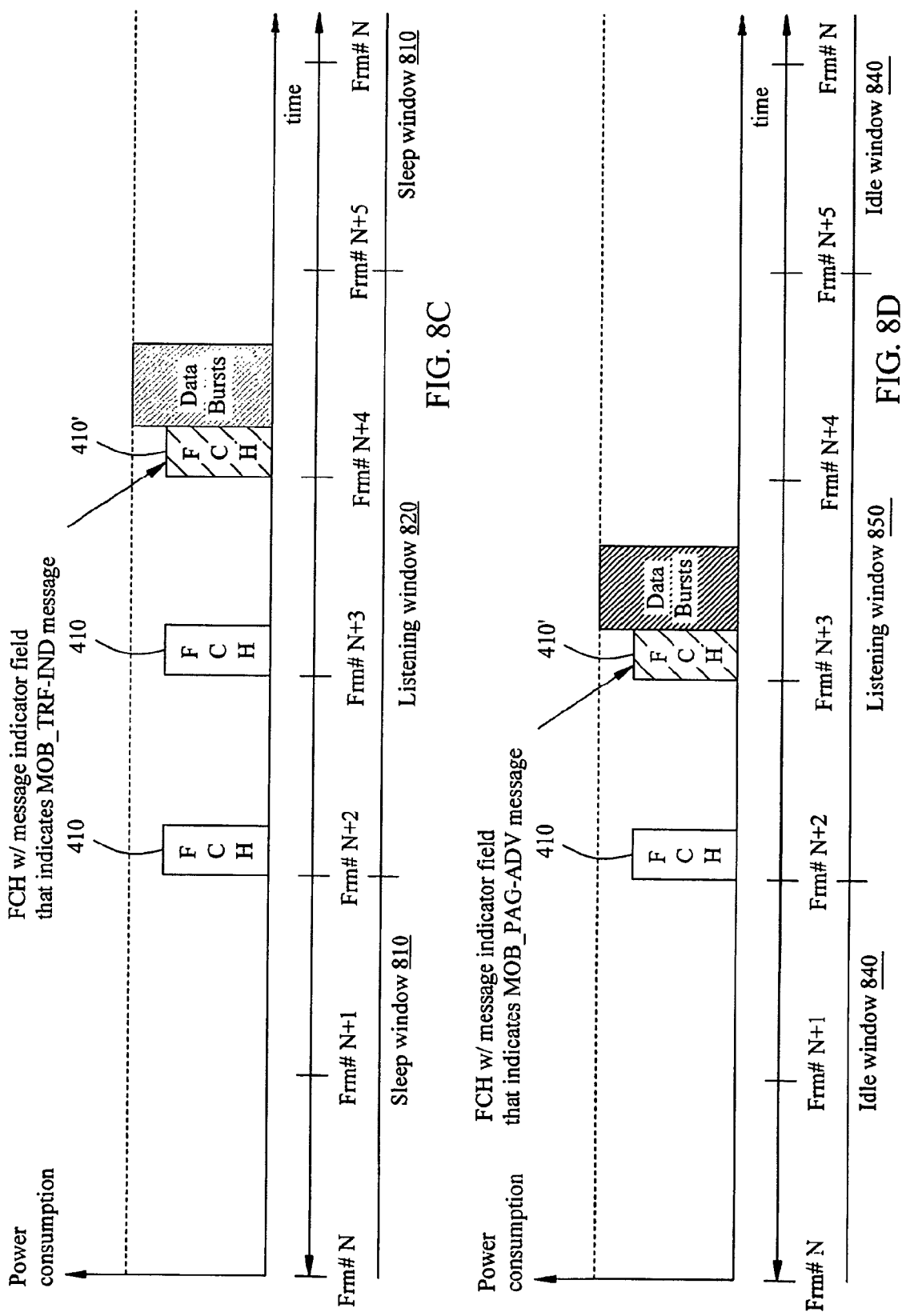

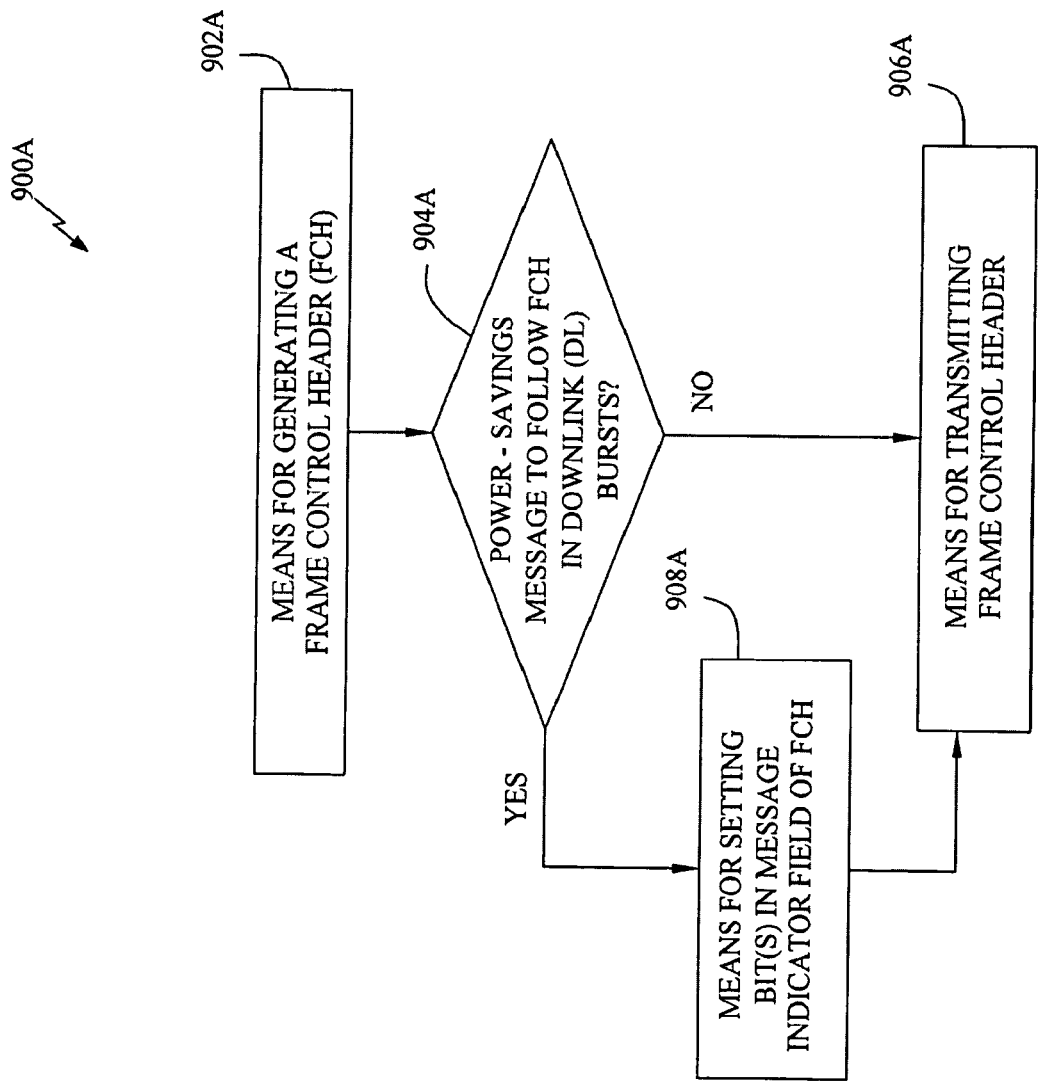

METHODS AND SYSTEMS FOR POWER SAVINGS USING A MESSAGE INDICATION HEADER

TECHNICAL FIELD

Certain embodiments of the present disclosure generally relate to wireless communication and, more particularly, to techniques for signaling a communications device that a frame of data contains relevant messages.

BACKGROUND

OFDM and OFDMA wireless communication systems under IEEE 802.16 use a network of base stations to communicate with wireless devices (i.e., mobile stations) registered for services in the systems based on the orthogonality of frequencies of multiple subcarriers and can be implemented to achieve a number of technical advantages for wideband wireless communications, such as resistance to multipath fading and interference. Each base station (BS) emits and receives radio frequency (RF) signals that convey data to and from the mobile stations (MS). Such an RF signal from a BS includes an overhead load, in addition to the data load (voice and other data), for various communication management functions. Each MS processes the information in the overhead load of each received signal prior to processing the data.

Under the current versions of the IEEE 802.16 standard for the OFDMA systems, every downlink subframe from a base station includes a preamble and a frame control header (FCH) following the preamble as part of the overhead load. The preamble includes information for searching a cell and a cell sector within a cell and for synchronizing a mobile station in both time and frequency with the received downlink signal. The FCH portion of the downlink subframe includes 24 bits with information on the downlink transmission format (e.g., the downlink media access protocol, or DL MAP) and control information for the downlink data reception (e.g., allocation of the subcarriers in the current downlink frame). Therefore, a receiver, such as a MS, first decodes the FCH to determine the coding type and length of the DL MAP, decodes the corresponding DL MAP, and then extracts the data.

Because power consumption is a significant concern in mobile communication devices, mobile stations may enter a sleep or idle mode and power down certain subsystems after a certain period of inactivity. However, even when a mobile communication device is in a sleep or idle mode, it needs to periodically awake and decode frames in order to "listen" for particular power-save related messages, such as paging messages, traffic indication messages, downlink channel description (DCD) messages, and uplink channel description (UCD) messages.

SUMMARY

Certain embodiments provide a method for selectively decoding frame data in a wireless communication device while the device is in a special operating state. The method generally includes receiving frame data including one or more data bursts and a frame control header with a message indication field, decoding the frame control header prior to decoding the data bursts, decoding one or more of the data bursts if one or more bits in the message indication field indicate the data bursts contain a message relevant to the special operating state, and waiting for subsequent frame data without decoding the data bursts if one or more bits in the message indication field indicate the data bursts do not contain a message relevant to the special operating state.

Certain embodiments provide a method for signaling a wireless communication device in a special operating state that a frame of data contains a message relevant to the special operating state. The method generally includes generating a frame control header for a frame with a message indication field having one or more bits for indicating a message relevant to the special operating state of the wireless communications device is contained in corresponding data bursts of the frame and transmitting the frame control header to the wireless communications device.

Certain embodiments provide a mobile station for selectively decoding frame data while the in a special operating state. The mobile station generally includes logic for receiving frame data including one or more data bursts and a frame control header with a message indication field, logic for decoding the frame control header prior to decoding the data bursts, logic for decoding one or more of the data bursts if one or more bits in the message indication field indicate the data bursts contain a message relevant to the special operating state, and logic for waiting for subsequent frame data without decoding the data bursts if one or more bits in the message indication field indicate the data bursts do not contain a message relevant to the special operating state.

Certain embodiments provide an apparatus for signaling that a frame of data contains a message relevant to a special operating state of a wireless device. The apparatus generally includes logic for generating a frame control header for a frame with a message indication field having one or more bits for indicating a message relevant to the special operating state of the wireless communications device is contained in corresponding data bursts of the frame and logic for transmitting the frame control header.

Certain embodiments provide a mobile station for selectively decoding frame data while the in a special operating state. The mobile station generally includes means for receiving frame data including one or more data bursts and a frame control header with a message indication field, means for decoding the frame control header prior to decoding the data bursts, means for decoding one or more of the data bursts if one or more bits in the message indication field indicate the data bursts contain a message relevant to the special operating state, and means for waiting for subsequent frame data without decoding the data bursts if one or more bits in the message indication field indicate the data bursts do not contain a message relevant to the special operating state.

Certain embodiments provide an apparatus for signaling that a frame of data contains a message relevant to a special operating state of a wireless device. The apparatus generally includes means for generating a frame control header for a frame with a message indication field having one or more bits for indicating a message relevant to the special operating state of the wireless communications device is contained in corresponding data bursts of the frame and means for transmitting the frame control header.

Certain embodiments provide a computer-readable medium containing a program for selectively decoding frame data in a wireless communication device while the device is in a special operating state which. When executed by a processor, the program performs operations generally including receiving frame data including one or more data bursts and a frame control header with a message indication field, decoding the frame control header prior to decoding the data bursts, decoding one or more of the data bursts if one or more bits in the message indication field indicate the data bursts contain a message relevant to the special operating state, and waiting for subsequent frame data without decoding the data bursts if one or more bits in the message indication field indicate the data bursts do not contain a message relevant to the special operating state.

Certain embodiments provide a computer-readable medium containing a program for signaling a wireless communication device in a special operating state that a frame of data contains a message relevant to the special operating state. When executed by a processor, the program performs operations generally including generating a frame control header for a frame with a message indication field having one or more bits for indicating a message relevant to the special operating state of the wireless communications device is contained in corresponding data bursts of the frame and transmitting the frame control header

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

FIGS. 5A and 5B illustrate a downlink Frame Prefix (DLFP) information, including a downlink message indication, which may be mapped to a frame control header (FCH) in accordance with certain embodiments of the present disclosure.

FIGS. 8A-8D illustrate potential power savings that may be achieved by implementing methods in accordance with certain embodiments of the present disclosure.

FIGS. 9 and 9A illustrate example operations for indicating power-saving messages are to follow in downlink bursts after a frame control header and components for performing the same, respectively, in accordance with certain embodiments of the present disclosure.

DETAILED DESCRIPTION

Figure 1:
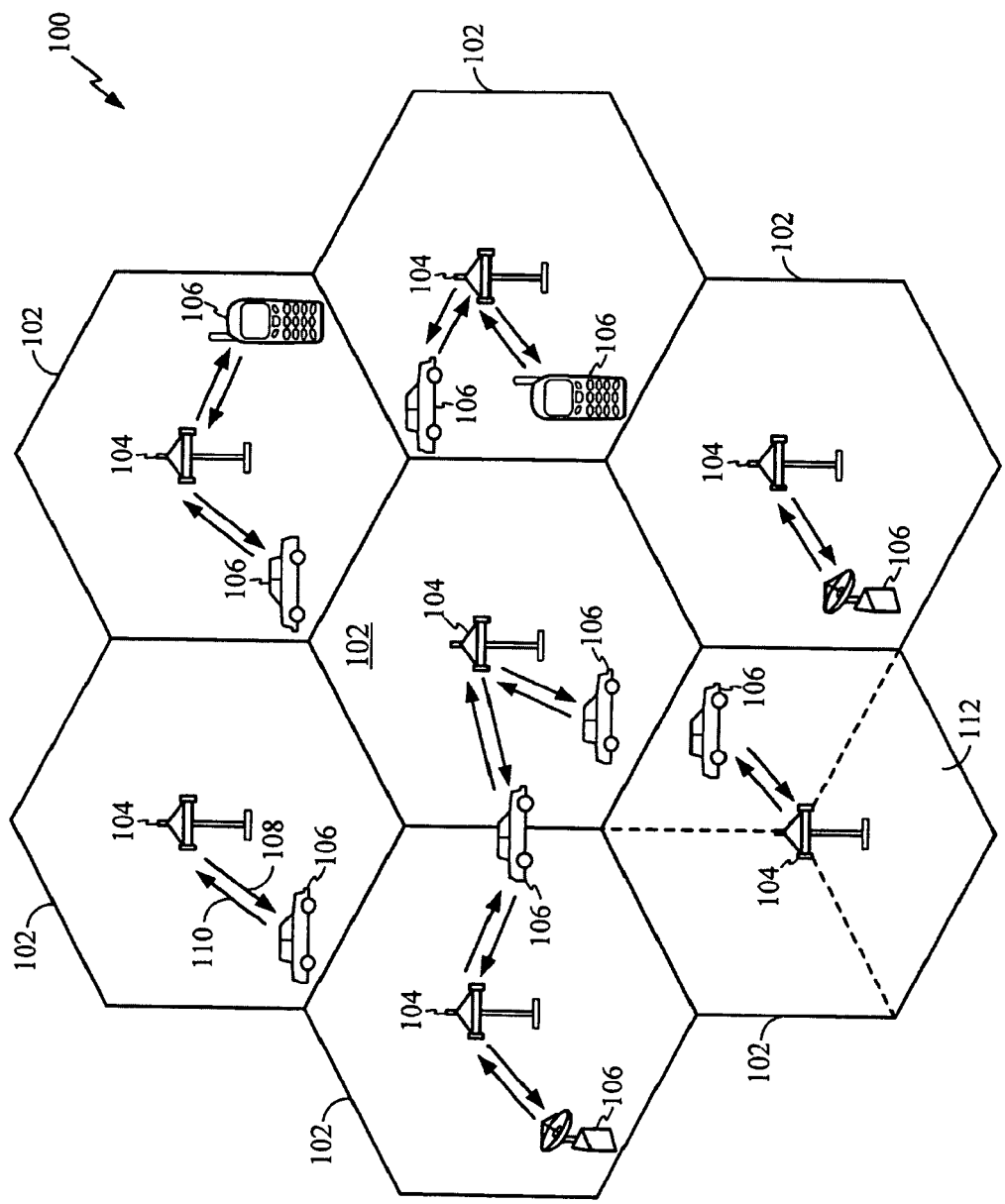
FIG. 1 illustrates an example wireless communication system, in accordance with certain embodiments of the present disclosure.

In an effort to reduce power consumption in a mobile station (MS), one or more bits of a downlink Frame Prefix (DLFP) may be utilized as a message indication (MI) field, informing the MS of the presence of one or more power-saving messages. As the DLFP may be mapped to the FCH and the FCH precedes DL Bursts, a MS may determine if a DL subframe contains one or more power-saving messages after simply decoding the FCH.

If the MI field indicates DL bursts contain relevant messages, the MS may decode the remaining portions of the frame and process the messages. On the other hand, if the MI field indicates DL subframes lack a power-saving message intended for the MS, the MS may go back to sleep without decoding a remaining portion of the frame. Thus, the proposed implementation of an MI field may help avoid the unnecessary decoding of an entire frame only to find there are no relevant messages, which may result in a power savings.

Exemplary Wireless Communication System

The methods and apparatus of the present disclosure may be utilized in a broadband wireless communication system. As used herein, the term "broadband wireless" generally refers to technology that may provide any combination of wireless services, such as voice, Internet and/or data network access over a given area.

WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

Mobile WiMAX is based on OFDM (orthogonal frequency-division multiplexing) and OFDMA (orthogonal frequency division multiple access) technology. OFDM is a digital multi-carrier modulation technique that has recently found wide adoption in a variety of high-data-rate communication systems. With OFDM, a transmit bit stream is divided into multiple lower-rate substreams. Each substream is modulated with one of multiple orthogonal subcarriers and sent over one of a plurality of parallel subchannels. OFDMA is a multiple access technique in which users are assigned subcarriers in different time slots. OFDMA is a flexible multiple-access technique that can accommodate many users with widely varying applications, data rates, and quality of service requirements.

The rapid growth in wireless internets and communications has led to an increasing demand for high data rate in the field of wireless communications services. OFDM/OFDMA systems are today regarded as one of the most promising research areas and as a key technology for the next generation of wireless communications. This is due to the fact that OFDM/OFDMA modulation schemes can provide many advantages such as modulation efficiency, spectrum efficiency, flexibility and strong multipath immunity over conventional single carrier modulation schemes.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
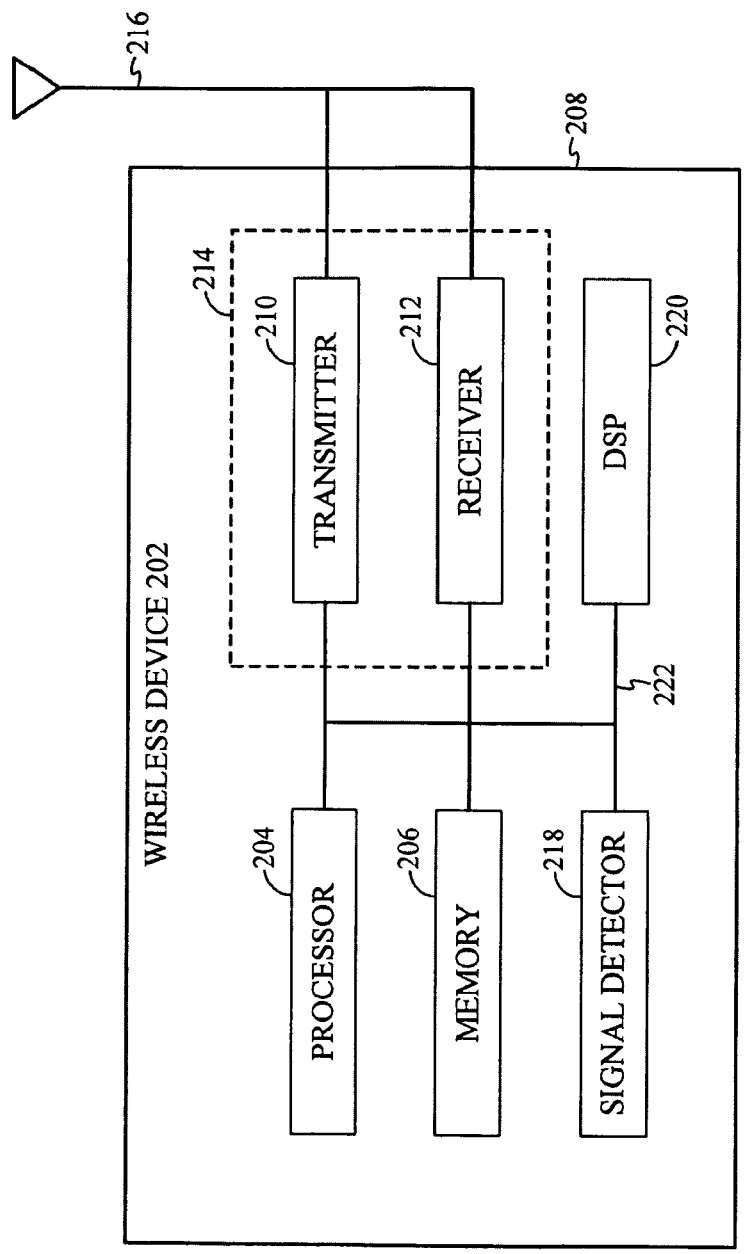
FIG. 2 illustrates various components that may be utilized in a wireless device in accordance with certain embodiments of the present disclosure.

FIG. 2 illustrates various components that may be utilized in a wireless device 202. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy per pseudonoise (PN) chips, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
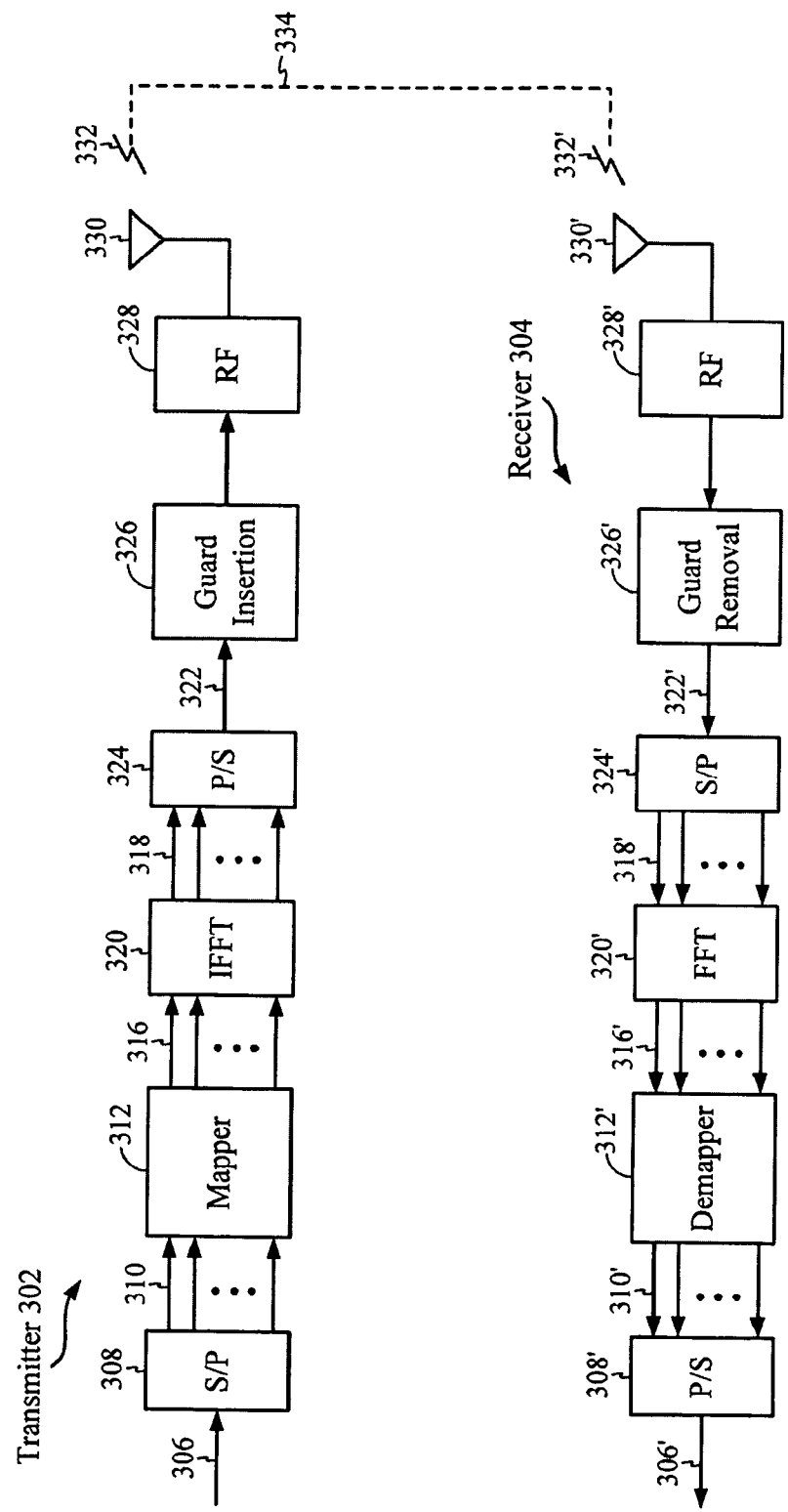
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8 PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless communication system 100 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302.

Exemplary OFDM(A) Frame

Figure 4:
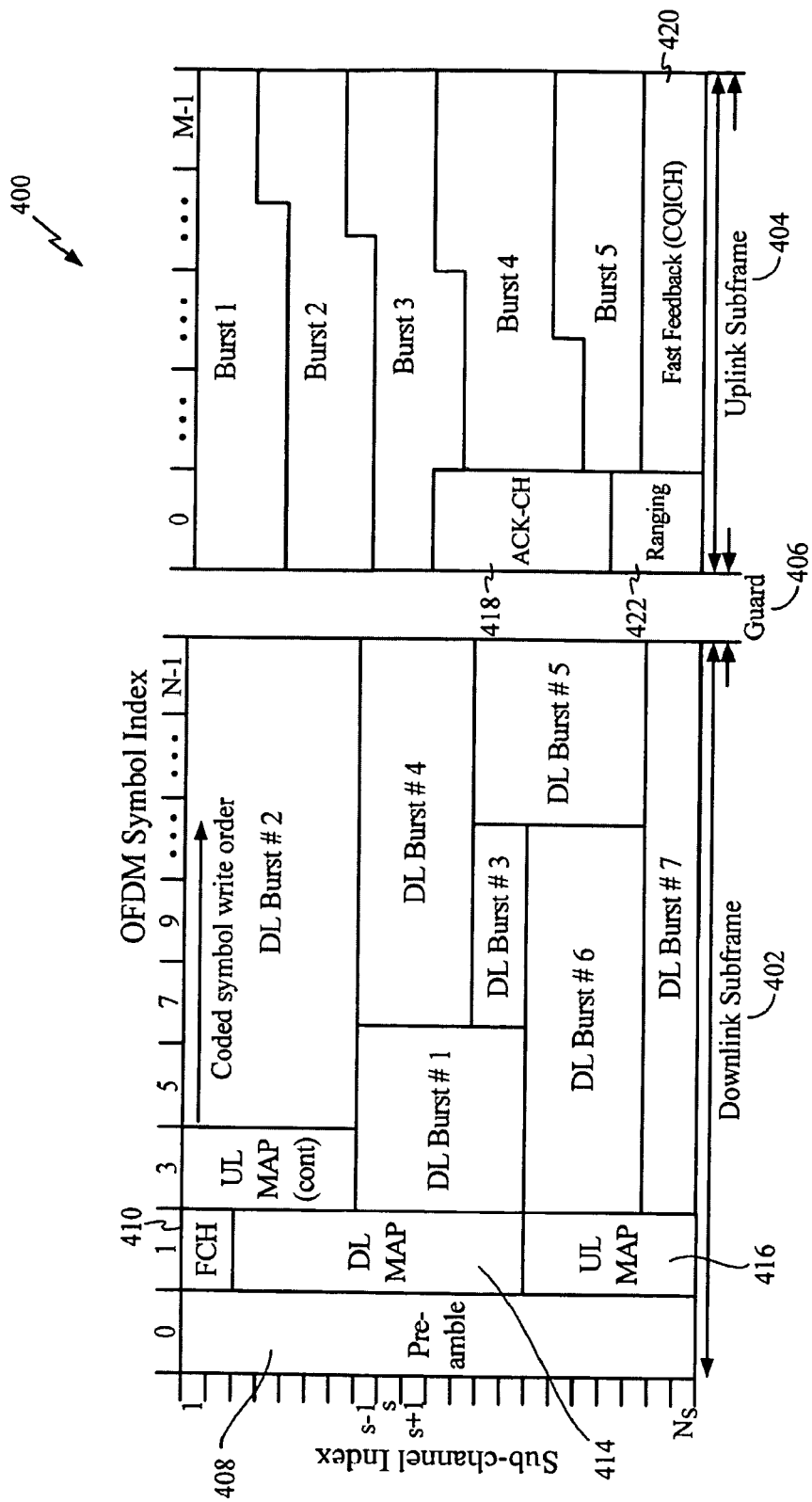
FIG. 4 illustrates an example of OFDMA frame for Time Division Duplex (TDD) in accordance with certain embodiments of the present disclosure.

Referring now to FIG. 4, an OFDM(A) frame 400 for a Time Division Duplex (TDD) implementation is depicted as a typical, but not limiting, example. Other implementations of an OFDM(A) frame, such as Full and Half-Duplex Frequency Division Duplex (FDD) may be used, in which case the frame is the same except that both downlink (DL) and uplink (UL) are transmitted simultaneously over different carriers. In the TDD implementation, each frame may be divided into a DL subframe 402 and a UL subframe 404, which may be separated by a small guard interval 406—or, more specifically, by Transmit/Receive and Receive/Transmit Transition Gaps (TTG and RTG, respectively)—in an effort to prevent DL and UL transmission collisions. The DL-to-UL-subframe ratio may be varied from 3:1 to 1:1 to support different traffic profiles.

Within the OFDM(A) frame 400, various control information may be included. For example, the first OFDM(A) symbol of the frame 400 may be a preamble 408, which may contain several pilot signals (pilots) used for synchronization. Fixed pilot sequences inside the preamble 408 may allow the receiver 304 to estimate frequency and phase errors and to synchronize to the transmitter 302. Moreover, fixed pilot sequences in the preamble 408 may be utilized to estimate and equalize wireless channels. The preamble 408 may contain BPSK-modulated carriers and is typically one OFDM symbol long. The carriers of the preamble 408 may be power boosted and are typically a few decibels (dB) (e.g., 9 dB) higher than the power level in the frequency domain of data portions in the WiMAX signal. The number of preamble carriers used may indicate which of the three segments of the zone are used. For example, carriers 0, 3, 6, . . . may indicate that segment 0 is to be used, carriers 1, 4, 7, . . . may indicate that segment 1 is to be used, and carriers 2, 5, 8, . . . may indicate that segment 3 is to be used.

A Frame Control Header (FCH) 410 may follow the preamble 408. The FCH 410 may provide frame configuration information, such as the usable subchannels, the modulation and coding scheme, and the Media Access Protocol (MAP) message length for the current OFDM(A) frame.

Following the FCH 410, a DL MAP 414 and a UL MAP 416 may specify subchannel allocation and other control information for the DL and UL subframes 402, 404. In the case of OFDMA, multiple users may be allocated data regions within the frame, and these allocations may be specified in the DL and UL MAP messages 414, 416. The MAP messages may include the burst profile for each user, which defines the modulation and coding scheme used in a particular link. The DL subframe 402 of the OFDM(A) frame may include DL bursts of various bit lengths containing the downlink data being communicated. Thus, the DL MAP 414 may describe the location of the bursts contained in the downlink zones and the number of downlink bursts, as well as their offsets and lengths in both the time (i.e., symbol) and the frequency (i.e., subchannel) directions.

Likewise, the UL subframe 404 may include UL bursts of various bit lengths composed of the uplink data being communicated. Therefore, the UL MAP 416, transmitted as the first burst in the downlink subframe 402, may contain information about the location of the UL burst for different users. The UL subframe 404 may include additional control information as illustrated in FIG. 4A. The UL subframe 404 may include a UL ACK 418 allocated for the mobile station (MS) to feed back a DL hybrid automatic repeat request acknowledge (HARQ ACK) and/or a UL CQICH 420 allocated for the MS to feed back channel state information on the Channel Quality Indicator channel (CQICH). Furthermore, the UL subframe 404 may comprise a UL Ranging subchannel 422. The UL Ranging subchannel 422 may be allocated for the MS to perform closed-loop time, frequency, and power adjustment, as well as bandwidth requests.

Altogether, the preamble 408, the FCH 410, the DL MAP 414 and the UL MAP 416 may carry information that enables the receiver 304 to correctly demodulate the received signal.

For OFDMA, different "modes" can be used for transmission in DL and UL. An area in the time domain where a certain mode is used is generally referred to as a zone. One type of zone is called DL-PUSC (downlink partial usage of subchannels) and does not use all the subchannels available to it (i.e., a DL-PUSC zone only uses particular groups of subchannels). There may be a total of six subchannel groups, which can be assigned to up to three segments. Thus, a segment can contain one to six subchannels (e.g., segment 0 contains three subchannel groups, segment 1 contains two, and segment 2 contains one subchannel group). Another type of zone is called DL-FUSC (downlink full usage of subchannels). Unlike DL-PUSC, DL-FUSC does not use any segments, but can distribute all bursts over the complete frequency range.

Exemplary Message Indication Field

Because power consumption is a significant concern in mobile communication devices, mobile stations are typically configured to enter a power-savings mode (e.g., a sleep or idle mode) and power down certain subsystems under certain conditions, for example, after a certain period of inactivity. As previously described, however, even when a mobile communication device is in a sleep or idle mode, it needs to periodically awake for a moment to receive power-save related messages such as paging messages, traffic indication messages, downlink channel description (DCD) messages, and uplink channel description (UCD) messages.

These power-save related messages are typically found in one or more DL bursts in a frame. In conventional systems, an MS must awake and decode an entire downlink (DL) subframe 402 to determine if a power-saving message is present. If a power saving message is not present in the decoded DL bursts, the MS may have unnecessarily decoded an entire DL subframe 402, resulting in a waste of power.

By including a message indicator (MI) field in a frame control header (FCH), certain embodiments of the present disclosure may help reduce power consumption by allowing an MS to determine the presence of a power-save related message by decoding only the FCH. If the MI field indicates DL subframes lack a power-saving message intended for the MS, the MS may go back to sleep without decoding a remaining portion of the frame, thereby reducing overall power consumption.

The MI field may be included in an FCH in any suitable manner that provides for an indication of the presence of a power-save related message in DL bursts that follow. For certain embodiments, the MI field may be implemented using a set of one or more bits in an FCH that, according to one or more versions of a standard, are reserved.

For example, FIG. 5A illustrates an example downlink Frame Prefix (DLFP) data structure 500, outlining the frame configuration information which may be mapped to the FCH 410 (see FIG. 4), as established under the IEEE 802.16e standard. As illustrated, the DLFP structure 500 may include 24-bits. Before being mapped to the FCH 410, the 24-bit DLFP may be duplicated to form a 48-bit block, which is the minimal forward error correction (FEC) block size.

The DLFP 500 may include a used subchannel (SCH) bitmap field 510, a repetition coding indication field 530, a coding indication field 540, and a Downlink Media Access Protocol (DL-MAP) message length 550. The DLFP structure 500 also includes a reserved bit 520 and a set of reserved bits 560, one or more of which may be used as an MI field.

For example, as illustrated in FIG. 5B, a DLFP structure 500' may utilize the (previously) reserved bits 560 as a message indication field 570, used to inform a receiving MS of the presence of one or more power-saving messages without having to decode DL Bursts in the frame. The bits of the MI field 570 may provide an indication of the presence of power-save related messages, as well as the type of message.

For example, the MI field may include a set of bits that each indicates the presence of a different type of power-save related message. In the illustrated example, a first bit (BIT #0) may be used to indicate the presence of a DCD/UCD message which identifies the physical layer characteristics of the downlink and uplink channels. A second bit (BIT #1) may be used to indicate the presence of a MOB_TRF-IND message signifying the arrival of traffic destined for the MS. A third bit (BIT #2) may be used to indicate the presence of a MOB_PAG-ADV message signifying a need for the MS to provide a location update to the BS, while bit #3 may remain a reserved bit.

Of course, for certain embodiments, rather than provide a separate bit for each message type, a multi-bit code may be utilized to indicate different message types, which may help conserve bits for other purposes. For example, using a two-bit code, code "00" may be used to indicate a DCD message, code "01" may be used to indicate a UCD message, "10" may be used to indicate a MOB_TRF-IND message and "11" may be used to indicate a MOB_PAG-ADV message.

Figure 6:
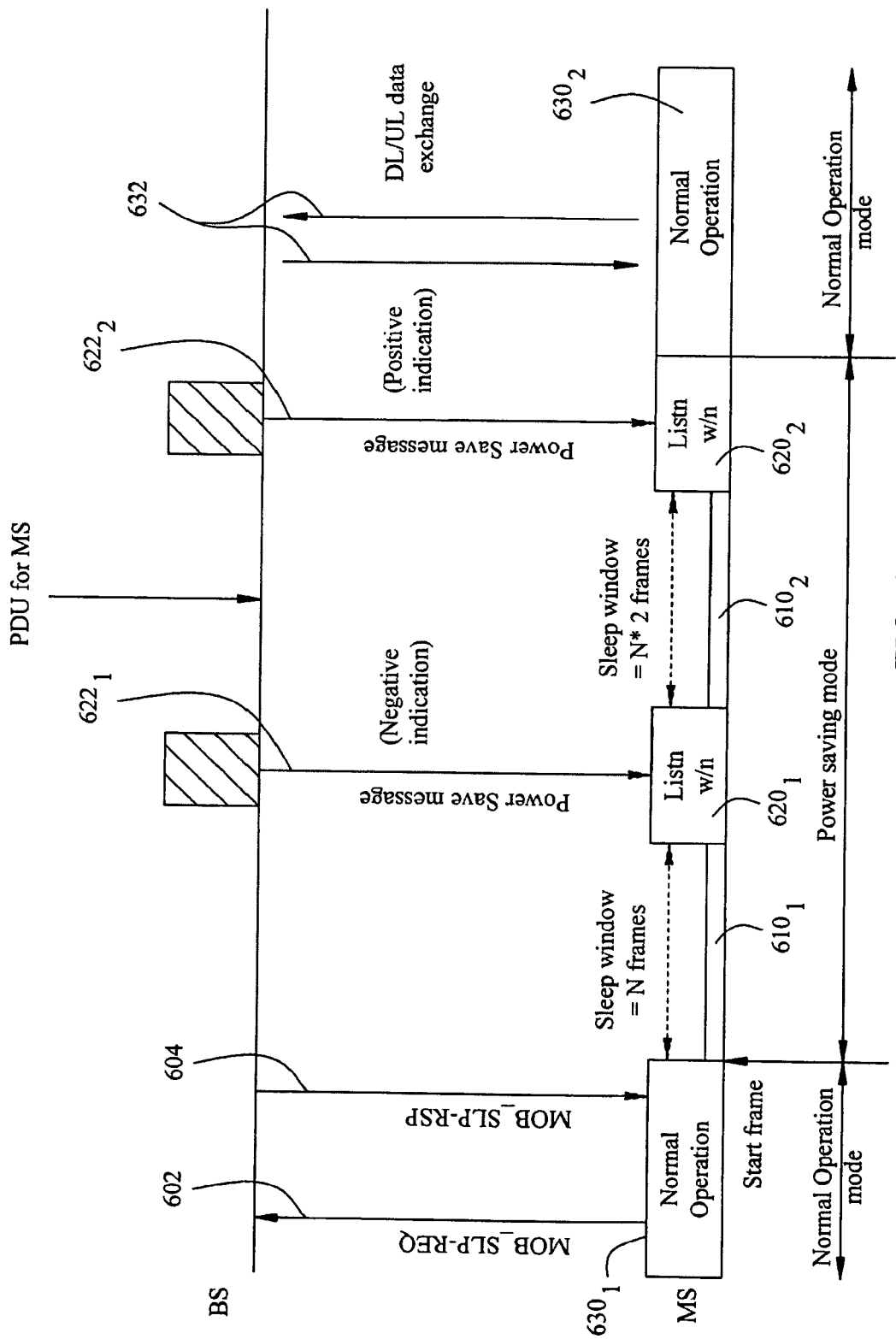
FIG. 6 illustrates example BS/MS interactions when the MS is entering and exiting a power saving mode in accordance with certain embodiments of the present disclosure.

FIG. 6 shows a timeline that illustrates how a BS may utilize an MI field to signal an MS that a frame contains a power-save related message targeting the MS. While the example illustrates a sleep mode, similar operations may be performed in other power savings mode, such as idle mode, as well as in initial acquisition states.

In a normal operating mode 630₁, the MS sends a sleep request 602 to the BS. The BS may respond (e.g., after determining that there is no immediate traffic for the MS), with a sleep response 604. After receiving the response, the MS may enter a sleep mode 610₁. Periodically, the MS may awake for a moment and enter a listening window 620₁ to receive power-save messages 622₁ such as paging messages, traffic indication messages, downlink channel description (DCD) messages, and uplink channel description (UCD) messages. The size of the sleep window and listening window may be established when the sleep mode is entered. Depending on a power savings class type, the sleep window may be fixed or may grow exponentially. For example, in FIG. 6, the sleep window grows from N frames (610₁) to N*2 frames (610₂) and a sleep window of N*4 frames, while not shown, would follow if the MS did not exit the sleep mode.

Regardless, during the listening window 620₁ the MS may receive a frame (622₁) and decode the FCH to check the MI field. If the MI field indicates the DL subframe does not contain a power-save message, the MS device may re-enter the power-save mode 610₂ without decoding remaining portions of the frame (e.g., DL Bursts), thereby reducing power consumption.

Sometime later the BS may receive traffic (e.g., a protocol data unit-PDU) intended for the MS. Therefore, during a subsequent listening window 620₂, the MS may receive a frame (622₂) with an FCH that has an MI field with a positive indication that DL bursts contain power-save related messages.

After decoding the FCH and checking the MI field to find this positive indication, the MS may decode remaining portions of the frame (e.g., DL Bursts) to process the message contained therein. For example, if the MI field indicates a MOB_TRF-IND message, the MS may decode a DL Burst containing the message and, in response to the message, enter a Normal Operation mode 630₂ involving downlink and uplink exchanges 632 between the MS and BS.

Figure 7:
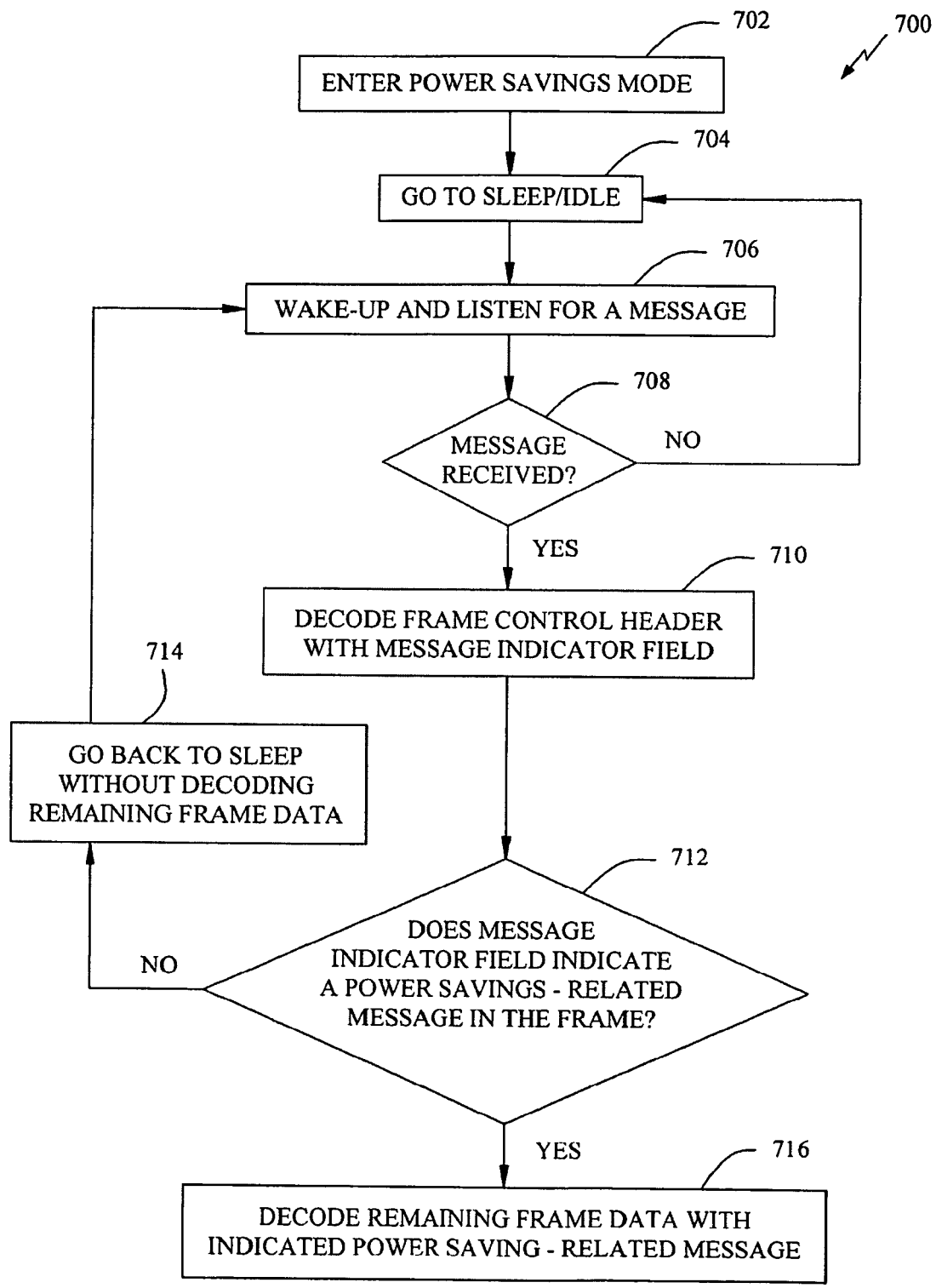
FIGS. 7 and 7A illustrate example operations for entering and exiting a power-savings mode and components for performing the same, respectively, in accordance with certain embodiments of the present disclosure.

FIG. 7 illustrates example operations 700 corresponding to the diagram in FIG. 6 that may be performed by an MS to vary the amount of a frame that is decoded, based on a MI field in a partially decoded frame. The operations 700 begin, at 702, by entering a power savings mode and, at 704, the MS goes to sleep (or idles).

At 706, the MS wakes up and listens for a message. If a message is not received, as determined at 706, the MS goes back to sleep at 704. If a message is received, however, the FCH with the MI field is decoded, at 710. If the MI field does not indicate a power-save related message is in the subsequent DL Bursts, the MS goes back to sleep without decoding remaining portions of the frame data, at 714.

If, however, the MI field does indicate a power-save related message is in the subsequent DL Bursts, the MS decodes remaining frame data to extract the power savings-related message, at 716. As previously described, the power savings-related message may prompt the MS to exit the sleep mode, for example, to receive a paging message or if the BS has traffic intended for the MS.

Figure 8A:
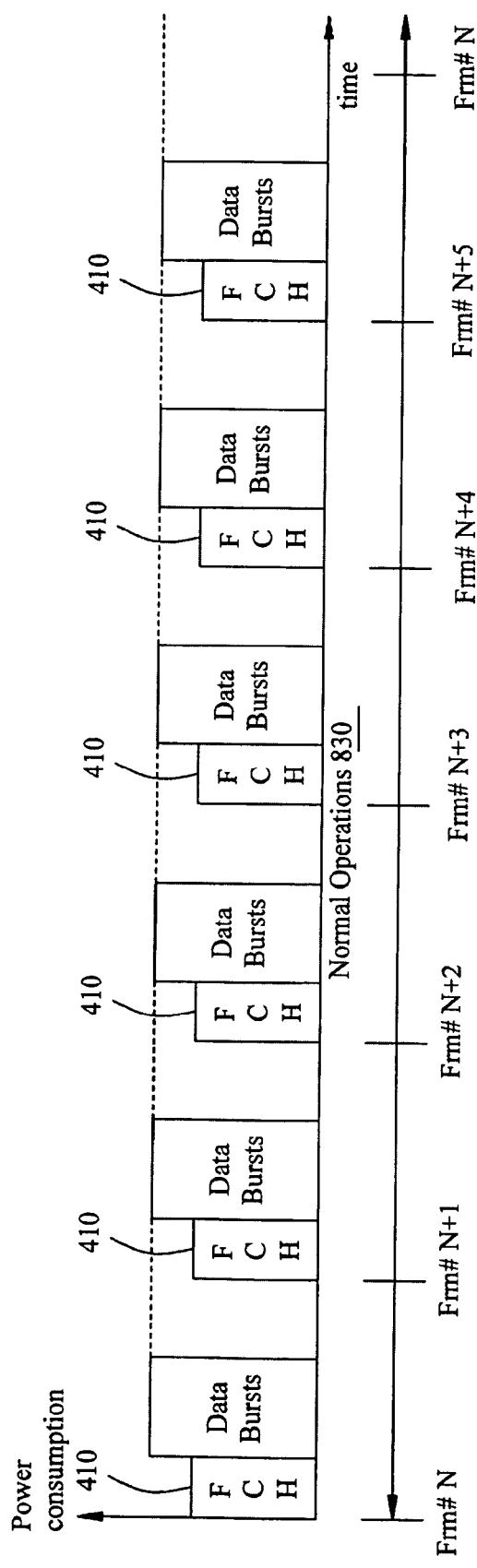

FIGS. 8A-D illustrate the power consumption associated with different modes of operations of an MS in accordance with certain embodiments of the present disclosure. FIG. 8A illustrates the power consumption of an MS in a normal operating mode 830, in which entire frames (FCH 410 and data bursts) are decoded.

Figure 8B:
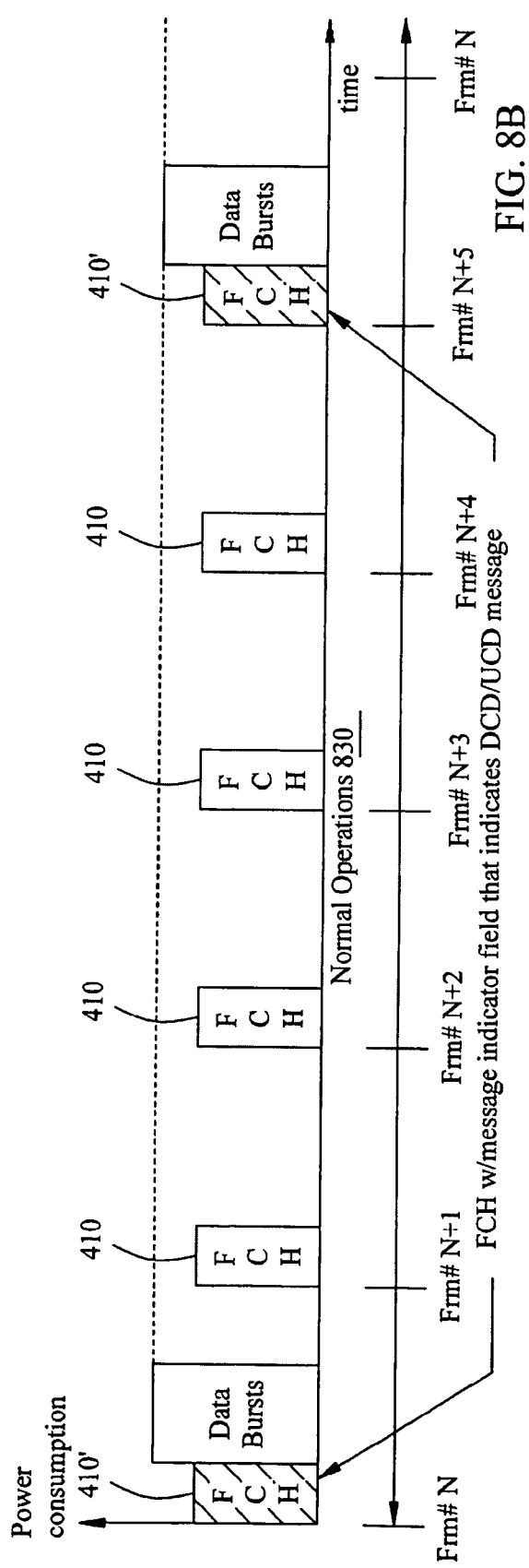

In contrast, FIG. 8B illustrates the power consumption of the MS during an initial acquisition state where the MS only needs to receive DCD and UCD messages. Since there are an unspecified number of frames that may occur between a DCD message and a UCD message, only the FCH of those frames, and not the remaining frame data, is decoded. However, when a decoded FCH indicates a related message is contained in the frame, the corresponding data bursts are decoded, as well.

FIG. 8C illustrates the power consumption of the MS in a sleep mode where the MS only needs to listen for a MOB-_TRF-IND message signifying the arrival of traffic destined for the MS. Since the MS would have received a message from the BS indicating acknowledgement of a sleep request prior to entering a sleep mode 810, parts of the MS would not be powered on to receive or decode a message during the sleep window. However, periodically, the MS may awake to enter a listening window 820 and wait for a message. As illustrated the MS may not receive a message during one or more frames of the listening window. In such instances, the MS may only decode the FCH 410 and go back to sleep without decoding the remaining frame data after determining the DL subframe 402 lacks a power-save message based on an evaluation of the message indication header. When the MS decodes an FCH 410 wherein the message indication header signifies the presence of a MOB_TRF-IND message, the MS decodes and processes the data bursts FIG. 8D illustrates the power consumption of a MS which is in an idle mode where the MS may only need to listen for a MOB_PAG-ADV message signifying a need for the MS to provide a location update to the BS. As in an idle mode, a certain parts of a MS in an idle mode may not be powered on to receive or decode a message during the idle window 840. As previously described, a MS may not receive a relevant power-save message during one or more frames of the listening window 850. In such instances, the MS may only decode the FCH 410 and stop decoding after determining the DL subframe 402 lacks a power-save message. When the MS decodes an FCH 410 with an MI field that signifies the presence of a MOB_PAG-ADV message, the MS decodes and processes the subsequent data bursts.

Figure 9:
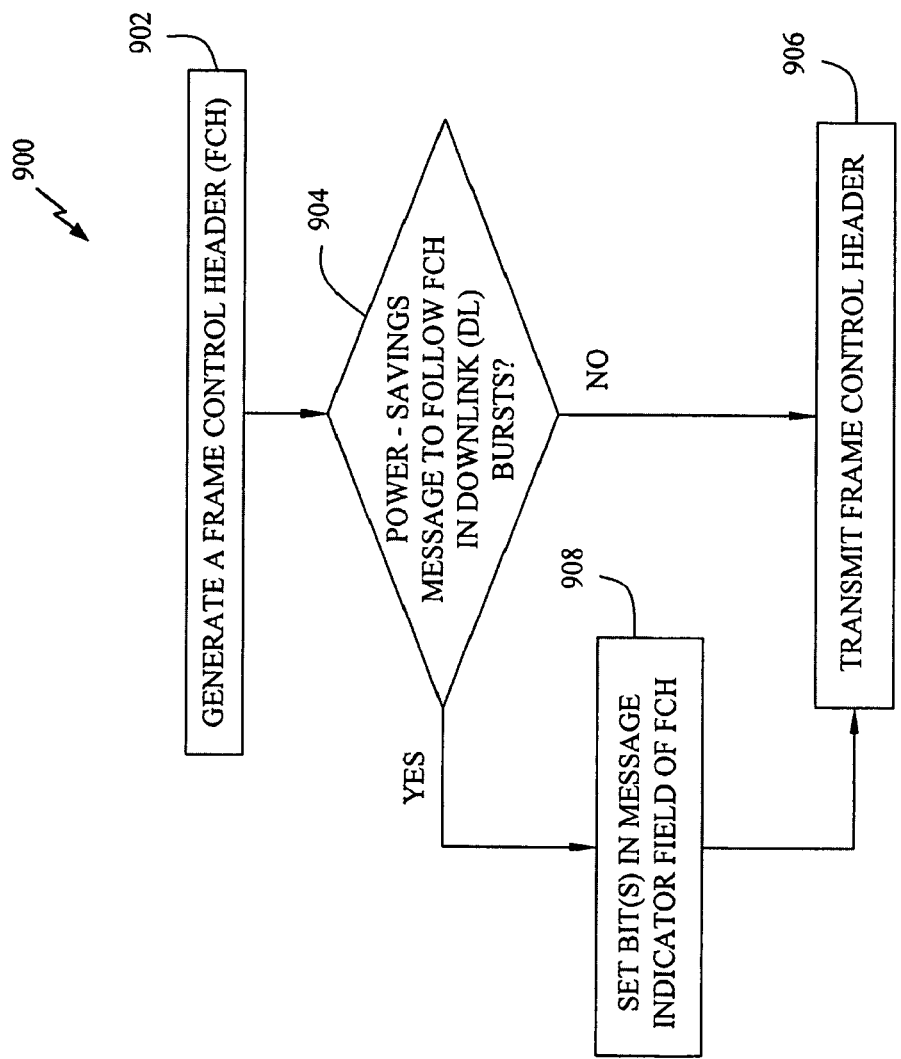

FIG. 9 illustrates example operations 900 that may be performed at a base station (BS) in order to signal a MS via a message indicator (MI) field of an FCH that a corresponding frame contains power-savings related messages. The operations begin, at 902, by generating a frame control header (FCH). If the corresponding frame data will have data bursts that contain power-savings related messages, as determined at 904, the BS sets one or more bits in the message indicator (MI) field of the FCH accordingly, at 906. The FCH with the MI field is transmitted at 908.

Figure 7A:
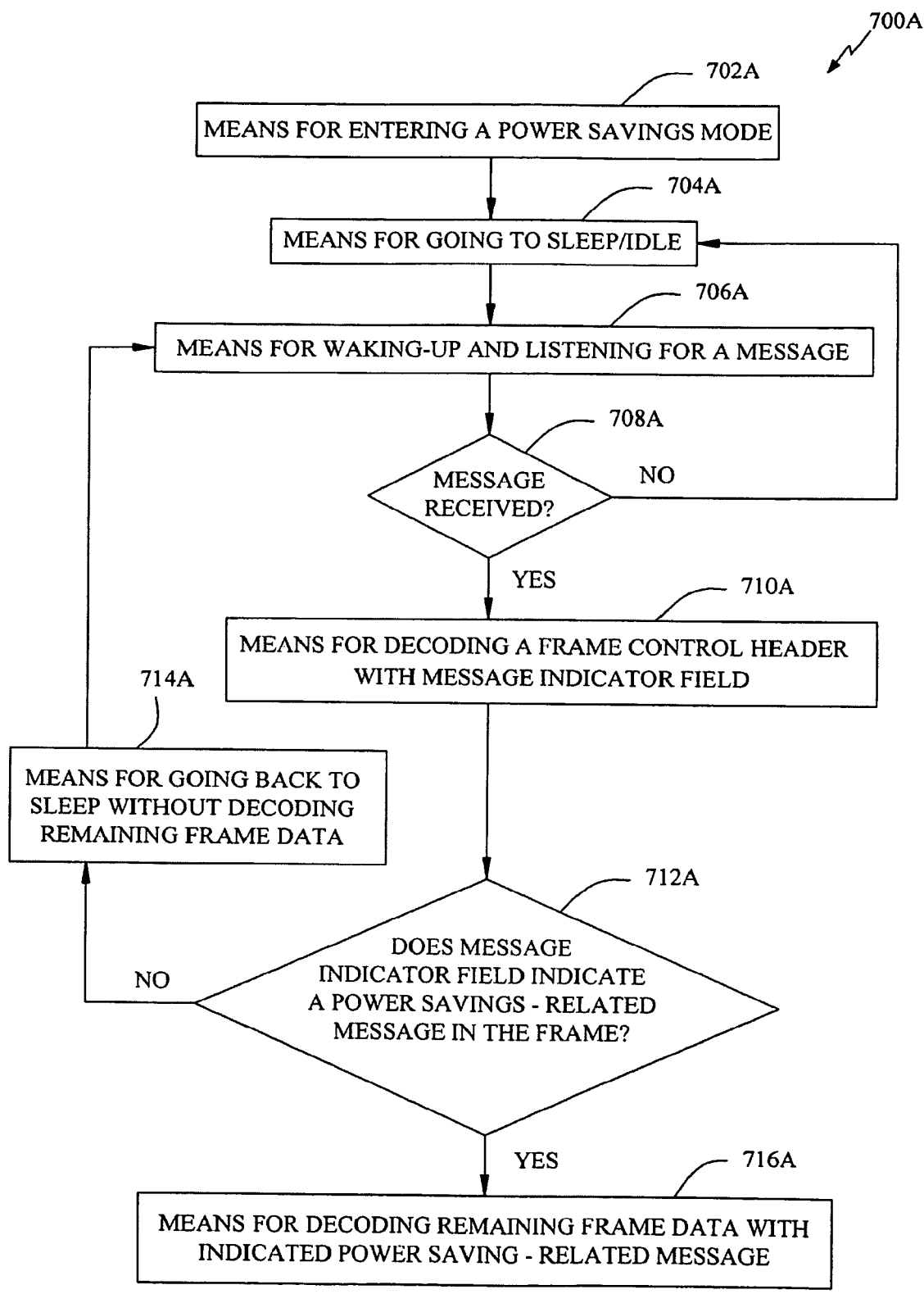

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 700-716 illustrated in FIG. 7 correspond to means-plus-function blocks 700A-716A illustrated in FIG. 7A. Similarly, blocks 900-908 illustrated in FIG. 9 correspond to means-plus-function blocks 900A-908A illustrated in FIG. 9A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as instructions of as one or more sets of instructions on a computer-readable medium or storage medium. A storage media may be any available media that can be accessed by a computer or one or more processing devices. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for selectively decoding frame data in a wireless communication device while the device is in a special operating state, comprising:
   receiving frame data including one or more data bursts and a frame control header with a message indication field while operating in the special operating state;
   decoding the frame control header prior to decoding the one or more data bursts; and
   determining whether to decode the one or more data bursts based at least in part on whether the message indication field comprises a set of message indications bits which indicate a presence of a power save related message,
   wherein a first configuration of the set of message indication bits indicates the presence of a channel message identifying physical characteristics of the channel,
   wherein a second configuration of the set of message indication bits indicates the presence of a traffic message signifying the arrival of traffic destined for the device, and
   wherein a third configuration of the set of message indication bits indicates the presence of a update message signifying a need for the device to provide a location update to a base station.

2. A mobile station for selectively decoding frame data while the in a special operating state, comprising:
   logic for receiving frame data including one or more data bursts and a frame control header with a message indication field while operating in the special operating state;
   logic for decoding the frame control header prior to decoding the one or more data bursts; and
   logic for determining whether to decode the one or more data bursts based at least in part on whether the message indication field comprises a set of message indications bits which indicate a presence of a power save related message,
   wherein a first configuration of the set of message indication bits indicates the presence of a channel message identifying physical characteristics of the channel,
   wherein a second configuration of the set of message indication bits indicates the presence of a traffic message signifying the arrival of traffic destined for the device, and
   wherein a third configuration of the set of message indication bits indicates the presence of a update message signifying a need for the device to provide a location update to a base station.

3. A mobile station for selectively decoding frame data while the in a special operating state, comprising:
   means for receiving frame data including one or more data bursts and a frame control header with a message indication field while operating in the special operating state;
   means for decoding the frame control header prior to decoding the one or more data bursts; and
   means for determining whether to decode the one or more data bursts based at least in part on whether the message indication field comprises a set of message indications bits which indicate a presence of a power save related message,
   wherein a first configuration of the set of message indication bits indicates the presence of a channel message identifying physical characteristics of the channel,
   wherein a second configuration of the set of message indication bits indicates the presence of a traffic message signifying the arrival of traffic destined for the device, and
   wherein a third configuration of the set of message indication bits indicates the presence of a update message signifying a need for the device to provide a location update to a base station.

4. A computer-program product for processing data for selectively decoding frame data in a wireless communication device while the device is in a special operating state comprising a computer readable medium having a set of instructions stored thereon, the set of instructions being executable by one or more processors and the set of instructions comprising:
   instructions for receiving frame data including one or more data bursts and a frame control header with a message indication field while operating in the special operating state;
   instructions for decoding the frame control header prior to decoding the one or more data bursts; and
   instructions for determining whether to decode the one or more data bursts based at least in part on whether the message indication field comprises a set of message indications bits which indicate a presence of a power save related message,
   wherein a first configuration of the set of message indication bits indicates the presence of a channel message identifying physical characteristics of the channel,
   wherein a second configuration of the set of message indication bits indicates the presence of a traffic message signifying the arrival of traffic destined for the device, and
   wherein a third configuration of the set of message indication bits indicates the presence of a update message signifying a need for the device to provide a location update to a base station.

5. The method of claim 1, wherein the determining comprises determining to decode the one or more data bursts where the frame control header comprises a message relevant to the special operating state.

6. The method of claim 5, further comprising:
   decoding at least one of the one or more data bursts, wherein the message comprises at least one of an uplink channel description (UCD) and a downlink channel description (DCD), and wherein the special operating state comprises a initial acquisition state.

7. The method of claim 5, further comprising:
   decoding at least one of the one or more data bursts, wherein the message signifies the arrival of traffic destined for the device, and wherein the special operating state comprises a sleep mode.

8. The method of claim 5, further comprising:
   decoding at least one of the one or more data bursts wherein the message comprises a paging message signifying the device to provide a location update to a base station, and wherein the special operating state comprises a idle mode.

9. The method of claim 1, wherein the determining comprises determining not to decode the one or more data bursts where the frame control header does not comprise a message relevant to the special operating state.

10. The method of claim 9, further comprising:
powering down one or more components for a sleep interval; and
powering up the powered down components during a listening interval, wherein the special operating state comprises a sleep mode.

11. The method of claim 1, wherein the first configuration of the set of message indication bits is indicated by a first bit, wherein the second configuration of the set of message indication bits is indicated by a second bit, and wherein the third configuration of the set of message indication bits is indicated by a third bit.

12. The method of claim 1, wherein the first configuration is indicated by a first combination of bit values for the set of message indication bits, wherein the second configuration is indicated by a second combination of bit values for the set of message indication bits, wherein the third configuration is indicated by a third combination of bit values for the set of message indication bits.

13. The mobile station of claim 2, wherein the logic for determining determines to decode the one or more data bursts where the frame control header comprises a message relevant to the special operating state.

14. The mobile station of claim 13, further comprising:
logic for decoding at least one of the one or more data bursts, wherein the message comprises at least one of an uplink channel description (UCD) and a downlink channel description (DCD), and wherein the special operating state comprises a initial acquisition state.

15. The mobile station of claim 13, further comprising:
logic for decoding at least one of the one or more data bursts, wherein the message signifies the arrival of traffic destined for the device, and wherein the special operating state comprises a sleep mode.

16. The mobile station of claim 13, further comprising:
logic for decoding at least one of the one or more data bursts, wherein the message comprises a paging message signifying the device to provide a location update to a base station, and wherein the special operating state comprises a idle mode.

17. The mobile station of claim 2, wherein the logic for determining determines not to decode the one or more data bursts where the frame control header does not comprise a message relevant to the special operating state.

18. The mobile station of claim 17, further comprising:
logic for powering down one or more components for a sleep interval; and
logic for powering up the powered down components during a listening interval, wherein the special operating state comprises a sleep mode.

19. The mobile station of claim 3, wherein the means for determining determines to decode the one or more data bursts where the frame control header comprises a message relevant to the special operating state.

20. The mobile station of claim 19, further comprising:
means for decoding at least one of the one or more data bursts, wherein the message comprises at least one of an uplink channel description (UCD) and a downlink channel description (DCD), and wherein the special operating state comprises a initial acquisition state.

21. The mobile station of claim 19, further comprising:
means for decoding at least one of the one or more data bursts, wherein the message signifies the arrival of traffic destined for the device, and wherein the special operating state comprises a sleep mode.

22. The mobile station of claim 19, further comprising:
means for decoding at least one of the one or more data bursts, wherein the message comprises a paging message signifying the device to provide a location update to a base station, and wherein the special operating state comprises a idle mode.

23. The mobile station of claim 3, wherein the means for determining determines not to decode the one or more data bursts where the frame control header does not comprise a message relevant to the special operating state.

24. The mobile station of claim 23, further comprising:
means for powering down one or more components for a sleep interval; and
means for powering up the powered down components during a listening interval, wherein the special operating state comprises a sleep mode.

25. The computer-program product of claim 4, wherein the instructions for determining determine to decode the one or more data bursts where the frame control header comprises a message relevant to the special operating state.

26. The computer-program product of claim 25, wherein the set of instructions further comprise:
instructions for decoding at least one of the one or more data bursts, wherein the message comprises at least one of an uplink channel description (UCD) and a downlink channel description (DCD), and wherein the special operating state comprises a initial acquisition state.

27. The computer-program product of claim 25, wherein the set of instructions further comprise:
instructions for decoding at least one of the one or more data bursts, wherein the message signifies the arrival of traffic destined for the device, and wherein the special operating state comprises a sleep mode.

28. The computer-program product of claim 25, wherein the set of instructions further comprise:
instructions for decoding at least one of the one or more data bursts, wherein the message comprises a paging message signifying the device to provide a location update to a base station, and wherein the special operating state comprises a idle mode.

29. The computer-program product of claim 4, wherein the instructions for determining determine not to decode the one or more data bursts where the frame control header does not comprise a message relevant to the special operating state.

30. The computer-program product of claim 29, wherein the set of instructions further comprise:
instructions for powering down one or more components for a sleep interval; and
instructions for powering up the powered down components during a listening interval, wherein the special operating state comprises a sleep mode.

* * * * *